No. 835,036. PATENTED NOV. 6, 1906.
W. N. ROBERTS & H. B. MATHEWS.
LAMP AND LANTERN HOLDER.
APPLICATION FILED MAR. 6, 1906.
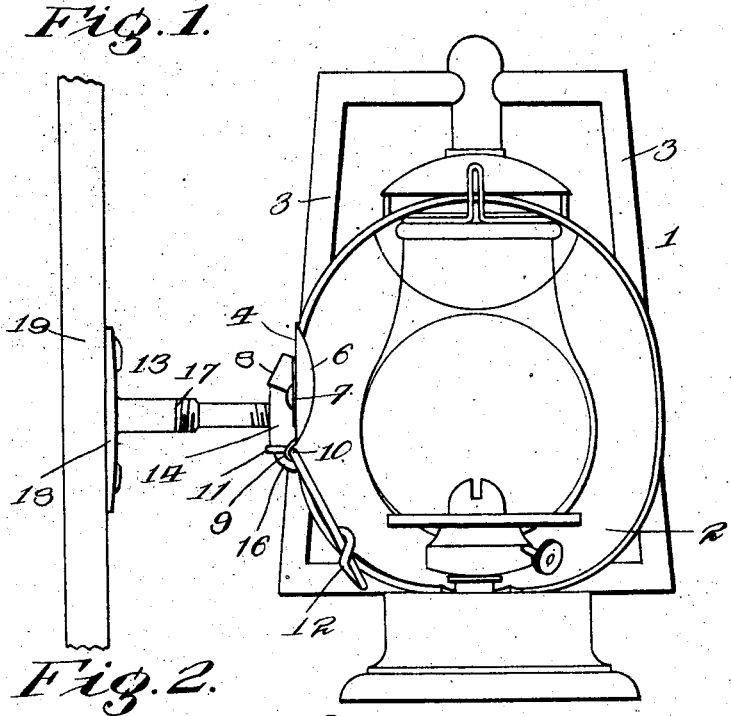
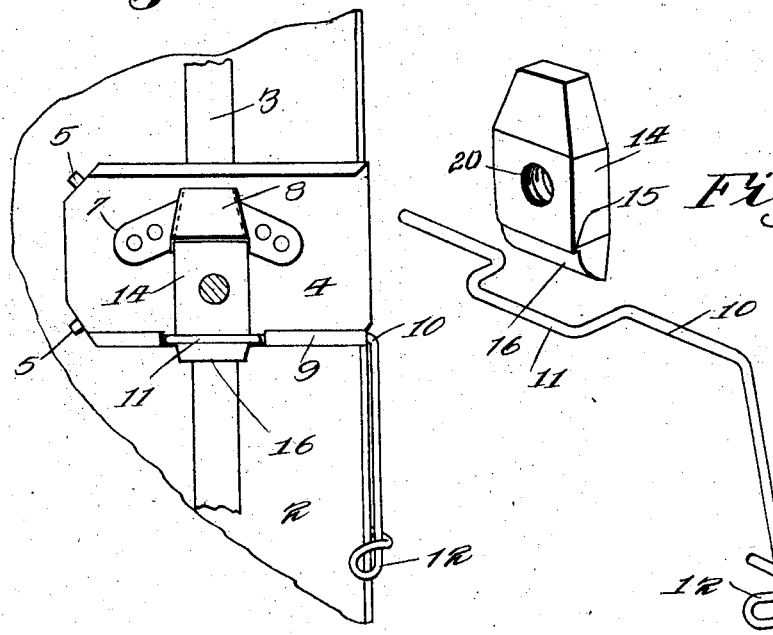
Witnesses
Jno Imrie
W. H. Woodson
Inventors
W. N. Roberts
H. B. Mathews
By R. H. A. B. Lacey, Attorneys
THE NORRIS PETERS CO., WASHINGTON, D. C.

UNITED STATES PATENT OFFICE.

WILLIAM N. ROBERTS AND HENRY B. MATHEWS, OF ANSONIA, OHIO.

LAMP AND LANTERN HOLDER.

No. 835,036.     Specification of Letters Patent.     Patented Nov. 6, 1906.

Application filed March 6, 1906. Serial No. 304,560.

*To all whom it may concern:*

Be it known that we, WILLIAM N. ROBERTS and HENRY B. MATHEWS, citizens of the United States, residing at Ansonia, in the county of Darke and State of Ohio, have invented certain new and useful Improvements in Lamp and Lantern Holders, of which the following is a specification.

The primary object of our invention is to provide an improved construction of lamp and lantern holder adapted to hold any sort of lamp or lantern in any desired position on any type of vehicle, such as a buggy or similar carriage, an automobile, or a bicycle or analogous vehicle.

A further object of the invention is to provide an improved lamp or lantern holder which in the present embodiment of the invention is particularly designed for attachment to the side of a buggy-top or similar vehicle in the proper position for night driving, where it will throw a maximum light along the road in front of the horse and with a minimum of shadow.

A further object of the invention is to provide an improved device of this character for use generally with vehicles of different types, as first-above named, which will be simple and cheap in construction, durable, and that may be readily manipulated to attach and detach the lamp or lantern from the part which is intended to carry it.

With these and other objects in view, as will more fully appear as the description proceeds, the invention consists in certain constructions, combinations, and arrangements of the parts hereinafter described and claimed.

In the present instance the device of our invention is illustrated as embodied in a lamp or lantern intended for night-driving and for attachment to a buggy or similar vehicle.

For a full description of the invention and the merits thereof and also to acquire a knowledge of the details of construction of the means for effecting the result reference is to be had to the following description and accompanying drawings, in which—

Figure 1 is a front elevation of a lantern embodying the improvements of our invention. Fig. 2 is a detail face view on an enlarged scale. Fig. 3 is a detail perspective view of the supporting-standard and the locking-clamp intended to coact therewith.

Corresponding and like parts are referred to in the following description and indicated in all the views of the drawings by the same reference characters.

Referring to the drawings, the numeral 1 designates a lantern of that type usually attached to the dashboard of a vehicle.

2 designates the reflector-hood of the lantern, and 3 the side bars of the lantern-frame.

4 designates a plate which may be secured to the lantern in any desired way and which in the present instance for the purposes of illustration only is shown as attached intermediate of its transverse length by solder to one of the side bars 3, by legs or braces 5 to the rear sides of the hood 2, and to the front edge of the hood, preferably by being bent around the same, as indicated at 6, and also by solder applied to said bent edge. The plate 4 is preferably rolled or bent upon itself at its upper edge to strengthen it, as illustrated in the drawings. On the outer face of the plate 4 is a preferably metallic strap 7, which is bent or buckled intermediate of its ends to form an angular and upwardly-tapered socket portion 8. The lower edge of the plate 4 is rolled upon itself at the two ends of the plate, as indicated at 9, to form a bearing for a clamp 10, which is mounted therein to turn about its longitudinal axis. The clamp 10 is formed in the present instance of wire and is bent intermediate of its ends to form an angular portion 11.

The clamp 10 projects in an angular direction from one end of the plate 4 and has such end bent or returned upon itself to form a finger-piece and lock 12. This finger-piece and lock is intended to be sprung around some stationary part of the socket-piece constituted by the plate 4 and strap 7 or around some stationary part of the lantern itself, such as the edge of the reflector-hood 2, in order to hold the clamp in locked position.

The support 13 is designed to directly carry the lantern 1 and embodies a standard 14, which in the present instance is a metallic block. The standard 14 is preferably flat on that face intended to lie adjacent the lantern, and it has a tapered upper end beveled on both side edges and front face, as shown, an oppositely-tapered lower end and downwardly-facing shoulder 15 on its outer side, and a curved or rounded surface 16 extending downwardly from said shoulder to its lower edge.

In the practical operation of attaching the lantern to its support the said standard 14 is snugly received in the socket portion 8, and the clamp 10 is then turned by means of the finger-piece 12 to carry its angular portion 11 up and around over the round portion 16 of the standard 14, and finally brings up against the downwardly-facing shoulder 15. The angular portion 11 of the clamp 10 is then sprung, so as to carry the finger-piece 12 over some stationary portion of the socket-piece or lantern, such as the edge of the reflector-hood 2, when it will snap past said edge to securely lock the standard of the socket.

The flat face of the standard enables it to lie snugly against the plate 4, and its upper tapered end also enables it to fit snugly in the socket without binding therein, while the lower tapered end permits the clamp to bind the standard tightly when locked. The round portion of the standard extending from the shoulder 15 downwardly allows the clamp to turn up around the lower end of the standard and to bind accurately against said shoulder.

While it is to be understood that the standard 14 may be secured to the vehicle in any desired manner, in the present instance it is shown as provided with a screw-threaded hole 20 of such size that the standard may be screwed on the post on the side of the buggy-top in place of the regular nut which holds the side brace on said post, the hole being bored at such an angle that the lantern will be carried in a perpendicular position. Such a post is shown in Fig. 1, (designated 17,) provided with an apertured base 18, secured to the side 19 of a buggy-top. Hence it will be seen that the standard 14 is complete in itself when access can be had to the post on a side of the buggy-top, and it is desired to carry the lantern at such point. It is to be understood, however, that the post 17 may be any projecting post within the purview of our invention.

Having thus described the invention, what is claimed as new is—

1. The combination with a lamp or lantern provided with a socket, of a standard designed to fit at one end in said socket and provided near its other end with a shoulder, and a clamp mounted to turn on the lantern and provided with a portion designed to be turned up over the shouldered end of the standard into binding engagement with said shoulder.

2. A lamp or lantern holder comprising a socket-piece designed to be secured to a lantern and provided with a downwardly-opening socket, a standard arranged for attachment to the vehicle or some stationary part and designed to fit upwardly in said socket, and a clamp mounted to turn on said socket-piece and provided with a clamping portion arranged to be turned up around and over the lower end of said standard whereby to lock the same in said socket.

3. The combination with a lamp or lantern provided with a socket-piece formed with a socket, of a standard designed to fit upwardly in said socket and provided on its outer face with a downwardly-facing shoulder, and a rounded portion extending from said shoulder to its lower edge, and a wire clamp mounted to turn in said socket-piece and provided with an intermediate angular portion designed to be carried around the lower round end of the standard into binding engagement with said shoulder.

4. The combination with a lamp or lantern of a socket-piece secured thereto and provided with a tapered socket, a standard having a tapered upper end designed to fit in said socket, said standard being provided with a lower rounded end and a downwardly-facing shoulder on its outer side, a wire clamp mounted to turn in said socket-piece and bent or buckled intermediate its ends to produce an angular portion adapted to be carried around the lower round end of the standard into engagement with said shoulder and having one of its ends bent angularly and formed with a finger-piece and lock designed to spring over some stationary part to hold the clamp in locked position.

5. The combination with a lamp or lantern, of a plate secured thereto, a strap attached at its ends to said plate and provided with an intermediate upwardly-tapering angular portion producing a socket, a standard having an upper tapered end designed to fit in said socket, and a clamp mounted in said plate and provided with an intermediate angular portion adapted to be carried around the lower end of said standard and into engagement therewith to clamp the standard in the socket.

6. The combination with a lamp or lantern, of a standard in the form of a block designed for detachable connection to the lamp or lantern to directly support it, said standard being provided with a screw-threaded aperture by which it is adapted to be screwed onto the post of a side of a buggy-top in place of the regular nut which holds the side brace on said post, as and for the purpose set forth.

In testimony whereof we affix our signatures in presence of two witnesses.

WILLIAM N. ROBERTS. [L. S.]
HENRY B. MATHEWS. [L. S.]

Witnesses:
  GEO. W. FISHER,
  O. F. VOKE.